US011655156B2

(12) United States Patent
Pluchon et al.

(10) Patent No.: US 11,655,156 B2
(45) Date of Patent: May 23, 2023

(54) COMPOSITE BASED ON A LAMELLAR MATERIAL AND A POROUS MATERIAL COMPRISING AN ACTIVE SUBSTANCE AND/OR A MICROORGANISM

(71) Applicants: AGRO INNOVATION INTERNATIONAL, Saint Malo (FR); UNIVERSITE DE HAUTE ALSACE, Mulhouse (FR); CENTRE NATIONAL DE LA RECHERCHE SCIENTIFIQUE, Paris (FR)

(72) Inventors: Sylvain K. Pluchon, Saint-Malo (FR); Jean-Claude Yvin, Saint-Malo (FR); Jocelyne Brendle, Wittenheim (FR); Lionel Limousy, Heidwiller (FR); Patrick Dutournie, Soppe le Bas (FR); Anne Maillard, Saint-Malo (FR); Marion Bruneau, Saint Jean de Thouars (FR); Simona Bennici, Illfurth (FR)

(73) Assignees: AGRO INNOVATION INTERNATIONAL, Saint-Malo (FR); UNIVERSITE DE HAUTE ALSACE, Mulhouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 298 days.

(21) Appl. No.: 16/964,125

(22) PCT Filed: Jan. 22, 2019

(86) PCT No.: PCT/FR2019/050142
§ 371 (c)(1),
(2) Date: Jul. 22, 2020

(87) PCT Pub. No.: WO2019/145637
PCT Pub. Date: Aug. 1, 2019

(65) Prior Publication Data
US 2021/0032179 A1 Feb. 4, 2021

(30) Foreign Application Priority Data
Jan. 23, 2018 (FR) .................................. 1850505

(51) Int. Cl.
*C01B 33/22* (2006.01)
*C05G 5/23* (2020.01)
(Continued)

(52) U.S. Cl.
CPC .............. *C01B 33/22* (2013.01); *A01C 21/00* (2013.01); *A01N 63/22* (2020.01); *A01N 63/30* (2020.01);
(Continued)

(58) Field of Classification Search
None
See application file for complete search history.

(56) References Cited

U.S. PATENT DOCUMENTS 5,252,542 A    10/1993  Allan
2009/0233107 A1  9/2009  Yamada et al.
(Continued)

FOREIGN PATENT DOCUMENTS

WO    2005009604    2/2005

OTHER PUBLICATIONS

U.S. Appl. No. 16/964,122, filed Jul. 22, 2020.
(Continued)

*Primary Examiner* — Wayne A Langel
(74) *Attorney, Agent, or Firm* — Hamre, Schumann, Mueller & Larson, P.C.

(57) ABSTRACT

The present invention concerns a process for preparing a composite of porous material/compound/hybrid organic-
(Continued)

inorganic material having a 2:1 lamellar structure, said hybrid material having the following general formula I:

$$Na_x[(Mg_3)(Al_x(RSi)_{4-x})O_{8+x}(OH)_2] \quad (I)$$

wherein
x is a number such that 0≤x<1.2 and
R represents a $C_1$-$C_{30}$ alkyl group, an aryl group, a ($C_1$-$C_{30}$ alkyl)aryl group or an O—($C_1$-$C_{30}$ alkyl) group, it being possible for the alkyl group to be substituted with a group chosen from a phenyl, vinyl, aminopropyl or mercaptopropyl group,
and said compound being chosen from the group constituted of at least one active substance and at least one microorganism and mixtures thereof the process comprising:
a) the step of sol-gel synthesis of the hybrid organic-inorganic material having a 2:1 lamellar structure in the presence of the compound and of the porous material saturated with the compound;
b) the recovery of the composite.
It also concerns a composite obtainable by means of this process, a composition comprising it and its use in particular for the fertilization of plants.

21 Claims, 1 Drawing Sheet

(51) Int. Cl.
| | | |
|---|---|---|
| C05G 5/12 | (2020.01) | |
| C05G 3/40 | (2020.01) | |
| C05G 5/40 | (2020.01) | |
| C05G 5/27 | (2020.01) | |
| A01C 21/00 | (2006.01) | |
| C05C 11/00 | (2006.01) | |
| C05F 11/08 | (2006.01) | |
| A01N 63/30 | (2020.01) | |
| A01N 63/22 | (2020.01) | |
| A01N 65/03 | (2009.01) | |

(52) U.S. Cl.
CPC .............. *A01N 65/03* (2013.01); *C05C 11/00* (2013.01); *C05F 11/08* (2013.01); *C05G 3/40* (2020.02); *C05G 5/12* (2020.02); *C05G 5/23* (2020.02); *C05G 5/27* (2020.02); *C05G 5/40* (2020.02)

(56) References Cited

U.S. PATENT DOCUMENTS

| | | |
|---|---|---|
| 2013/0040817 A1 | 2/2013 | Dreher et al. |
| 2014/0230504 A1 | 8/2014 | Finlayson et al. |
| 2020/0230065 A1 | 7/2020 | Urrutia Sagardia et al. |

OTHER PUBLICATIONS

Claverie Marie et al. "Synthetic Talc and Talc-Like Structures: Preparation. Features and Applications", vol. 24, No. 3, Jan. 12, 2018, pp. 519-542, Chemistry—A European Journal, Wiley—V C H Verlag GMBH & Co. KGAA.

Hua Shao et al. Synthesis and Properties of Nanoparticle Forms Saponite Clay. Cancrinite Zeolite and Phase Mixtures Thereof, Apr. 9, 2010, 18 pages.

Lorena Betancor et al. "Advantages of the Pre-Immobilization of Enzymes on Porous Supports for Their Entrapment in Sol-Gels", Biomacromolecules 2005, 6, 1027-1030.

Rimple B. Bhatia et al. "Aqueous Sol-Gel Process for Protein Encapsulation" Chemistry of Materials, vol. 12, No. 8, Aug. 1, 2000, pp. 2434-2441.

Gill I et al. "Bioencapsulation within synthetic polymers (Part 1): sol-gel encapsulated biologicals" Trends in Biotechnol, Elsevier Publications, Cambridge, GB, vol. 18, No. 7, Jul. 1, 2000, pp. 282-296.

Nadine Nassif et al. "A sol-gel matrix to preserve the viability of encapsulated bacteria" Journal of Materials Chemistry, GB, vol. 13, No. 2, Jan. 10, 2003, pp. 203-208.

F. L. Sousa et al. "Encapsulation of essential oils in SiO2 microcapsules and release behaviour of volatile compounds" Journal Of Microencapsulation., GB,vol. 31, No. 7, Apr. 25, 2014, 10 pages.

International Search Report and Written Opinion issued for International Patent Application No. PCT/FR2019/050142, dated Jun. 24, 2019, 17 pages including English translation of Search Report.

International Search Report and Written Opinion issued for International Patent Application No. PCT/FR2019/050140, dated Jun. 24, 2019, 18 pages including English translation of Search Report.

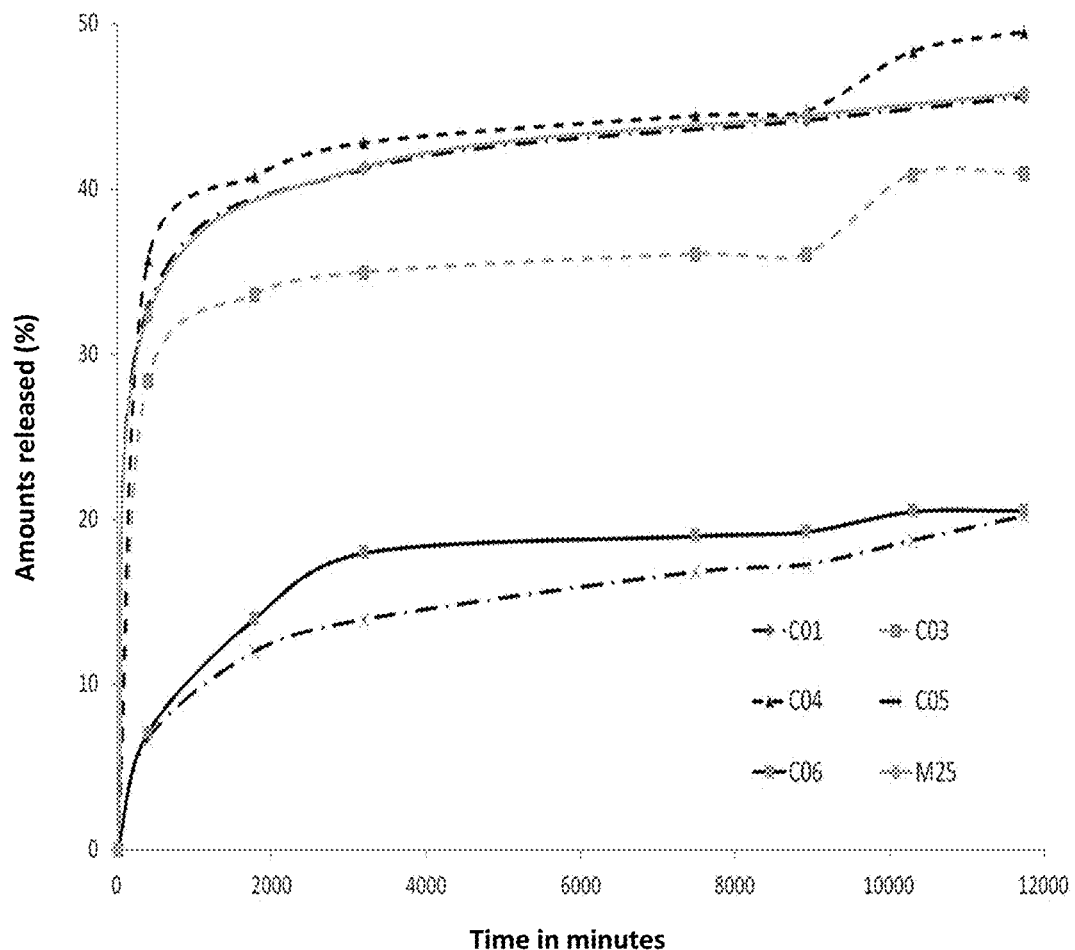

COMPOSITE BASED ON A LAMELLAR MATERIAL AND A POROUS MATERIAL COMPRISING AN ACTIVE SUBSTANCE AND/OR A MICROORGANISM

The present invention relates to the use of lamellar materials and porous materials for the production of a composite comprising active substances and/or microorganisms intended for the growth or treatment of plants.

The inventors have discovered, surprisingly, that it is possible to encapsulate such microorganisms and/or active substances within composites based on synthetic clay of talc or saponite type and porous material during the synthesis of these clays, while at the same time maintaining the activity of the active substances and of the microorganisms and while allowing their controlled release over time in the soil or in the plant.

Such a composite has never been described in the prior art.

The present invention therefore relates to a process for preparing a composite of porous material/compound/hybrid organic-inorganic material having a 2:1 lamellar structure, said hybrid material having the following general formula I:

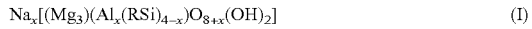

$$Na_x[(Mg_3)(Al_x(RSi)_{4-x})O_{8+x}(OH)_2] \quad (I)$$

wherein
x is a number such that $0 \leq x < 1.2$ and
R represents a $C_1$-$C_{30}$ alkyl group, an aryl group, a ($C_1$-$C_{30}$ alkyl)aryl group or an O—($C_1$-$C_{30}$ alkyl) group, it being possible for the alkyl group to be substituted with a group chosen from a phenyl, vinyl, aminopropyl or mercaptopropyl group
and said compound being chosen from the group constituted by at least one active substance, at least one microorganism and mixtures thereof, the process comprising:
a) the step of sol-gel synthesis of the hybrid organic-inorganic material having a 2:1 lamellar structure in the presence of the compound and of the porous material saturated with the compound;
b) the recovery of the composite.

The present invention thus relates to a process for preparing a composite based on a hybrid organic-inorganic material having a 2:1 lamellar structure. Said hybrid organic-inorganic material having a 2:1 lamellar structure has the following general formula I:

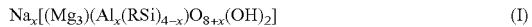

$$Na_x[(Mg_3)(Al_x(RSi)_{4-x})O_{8+x}(OH)_2] \quad (I)$$

wherein
x is a number such that $0 \leq x < 1.2$ and
R represents a $C_1$-$C_{30}$ alkyl group, advantageously an n-hexadecyl group or a methyl group, in particular an n-hexadecyl group; an aryl group, advantageously a phenyl group; a ($C_1$-$C_{30}$ alkyl)aryl group, advantageously an ethylphenyl group; or an O—($C_1$-$C_{30}$ alkyl) group, advantageously an ethoxy group; it being possible for the alkyl group to be substituted with a group chosen from a phenyl, vinyl, aminopropyl or mercaptopropyl group. For the purposes of the present invention, the term "$C_1$-$C_{30}$ alkyl group" is intended to mean any linear or branched saturated alkyl group having from 1 to 30 carbon atoms, such as the methyl, ethyl, n-propyl, isopropyl, n-butyl, isobutyl, sec-butyl, tert-butyl, n-pentyl, isopentyl, sec-pentyl, sec-isopentyl, neopentyl, n-hexyl, 2-methylpentyl, 3-methylpentyl, 2,2-dimethylbutyl, 2,3-dimethyl butyl, n-heptyl, n-octyl, n-nonyl, n-decyl, n-undecyl, n-dodecyl, n-pentadecyl, n-hexadecyl, n-icosyl or n-triacontyl group. Advantageously, it is the methyl, ethyl, n-propyl, isopropyl or n-hexadecyl group, even more advantageously the methyl, ethyl or n-hexadecyl group, more particularly the ethyl or n-hexadecyl group.

For the purposes of the present invention, the term "aryl group" is intended to mean one or more aromatic rings having 5 to 20 carbon atoms, that may be attached or fused. In particular, the aryl groups may be monocyclic, bicyclic or polycyclic groups. Preferably, it is the phenyl, biphenyl, naphthyl, anthracenyl, phenanthrenyl, tetracenyl, chrysenyl, triphenylenyl, pyrenyl, benzofluorenyl or benzopyrenyl group. Advantageously, it is a phenyl group.

The hybrid organic-inorganic material having a lamellar structure is of 2:1 type. It therefore involves silicates formed by stacks of sheets which are constituted by an octahedral layer surrounded on either side by two tetrahedral layers. The Si atom and the Al atom (if present) are in the tetrahedral layer and the Mg atom is in the octahedral layer. The Na atom, if it is present, is in the interlayer space. The material can thus be of talc type (when x=0) or of saponite type (x≠0). Advantageously, it is of talc type, that it to say that x=0.

The source of silicon required for the synthesis of the hybrid material of formula I is advantageously an organoalkoxysilane or a mixture of organoalkoxysilanes of the following general formula II: $RSi(OR')_3$ (II) wherein
R is as defined above and
R' is a methoxy or ethoxy group.

Advantageously, the silicon source is chosen from the group constituted by:
phenyltrimethoxysilane (PhenylTMS) of the following formula (a): Phenyl-Si(OCH$_3$)$_3$ (a);
tetraethyl orthosilicate or tetraethylsilane (TEOS) of the following formula (b): Si(OC$_2$H$_5$)$_4$ (b);
hexadecyltrimethoxysilane (C$_{16}$TMS) of the following formula (c): CH$_3$(CH$_2$)$_{14}$CH$_2$—Si(OCH$_3$)$_3$ (C)
methyltriethoxysilane (MTES) of the following formula (d): CH$_3$—Si(OCH$_3$)$_3$ (d)
phenethyltrimethoxysilane of the following formula (e): Phenyl-(CH$_2$)$_2$Si(OCH$_3$)$_3$ (e);
triethoxyphenylsilane of the following formula (f): Phenyl-Si(OC$_2$H$_5$)$_3$ (f);
and mixtures thereof.

In particular, it is chosen from the group constituted of methyltriethoxysilane, phenyltrimethoxysilane, tetraethyl orthosilicate, hexadecyltrimethoxysilane and mixtures thereof, more particularly from the group constituted of phenyltrimethoxysilane, tetraethyl orthosilicate, hexadecyltrimethoxysilane and mixtures thereof.

In the case of the mixtures, said mixture can in particular be a mixture between tetraethyl orthosilicate and phenyltrimethoxysilane or between tetraethyl orthosilicate and hexadecyltrimethoxysilane; advantageously it is a mixture between tetraethyl orthosilicate and phenyltrimethoxysilane.

These mixtures can be prepared in any proportion.

Advantageously, the silicon source is hexadecyltrimethoxysilane (c).

The compound of the composite according to the invention is chosen from the group constituted of at least one active substance, at least one microorganism and mixtures thereof.

For the purposes of the present invention, the term "active substance" is intended to mean any biologically active organic substance, that is to say any organic substance capable of reacting with living organisms, in particular plants, and therefore playing a specific role in the metabolism, for example either by acting directly on the plant, or by acting on the soil or the culture substrate, or else by acting on the pests or, on the contrary, on the useful organisms. This type of substance can thus allow fertilization, nutrition, growth stimulation and/or prophylaxis of plants and/or improvement of the physical, chemical and/or biological properties of the soil or the culture substrate of the plants. The active substance may be a molecule, but also a plant extract, an algal extract, a humic extract or extracts or co-products of any other type. It may be of natural or synthetic origin, such as a hormone, a protein, an oligosaccharide, a lipid such as an essential oil, an enzyme, an amino acid such as tryptophan, a vitamin such as folic acid or the active substance of a medicament or of a phytopharmaceutical product, such as a pesticide, fungicide, herbicide or nematicide. In one advantageous embodiment, the active substance is chosen from the group constituted of an amino acid, in particular tryptophan, an essential oil and mixtures thereof; advantageously, it is an amino acid, in particular tryptophan.

In one particular embodiment, the compound according to the invention is therefore at least one active substance. It may thus be a mixture of 2, 3 or 4 active substances, in particular of 2 or 3 active substances.

In one advantageous embodiment, a single active substance is present in the composite, such as for example tryptophan.

In another particular embodiment, the compound according to the invention is thus at least one microorganism. Advantageously, the microorganism is chosen from the group constituted of a bacterium such as *Bacillus subtilis* (for example accessible under number CIP 52.62 from the Institut Pasteur), a microalga such as *spirulina* (for example the cyanobacterium *Arthrospira platensis* sold under the name *Spirulina* Natural by the company Earthrise®), a fungus such as *Piriformospora indica* (for example accessible under number DSM 11827 from the Max-Planck-Institut für terrestrische Mikrobiologie), and mixtures thereof; advantageously, the microorganism is in vegetative form, in encysted form or in sporulated form, more particularly it is a bacterium such as *Bacillus subtilis*; even more particularly in vegetative form.

The compound according to the invention may thus consist of a single type of microorganism, such as the bacterium *Bacillus subtilis*. It may also consist of a mixture of 2, 3 or 4 types of different microorganisms, in particular of 2 or 3 types of different microorganisms.

In one advantageous embodiment, it consists of a single type of microorganism.

In yet another particular embodiment, the compound according to the invention is a mixture of at least one active substance and at least one microorganism.

For the purpose of the present invention, the term "porous material" is intended to mean any organic or inorganic material comprising open pores capable of containing the compound according to the invention. In particular, it may be lamellar double hydroxides, biocompatible polymers comprising mineral fillers, activated or non-activated carbon, zeolite, diatomaceous earth, biochar, char, pyrolyzed organic matter, more advantageously activated carbon.

In one advantageous embodiment, step a) of the process according to the present invention comprises the following steps:
a1) addition of a magnesium source, advantageously of magnesium nitrate hexahydrate, of the compound, of the porous material saturated with the compound, of the silicon source, in the case where x≠0, of the aluminum source, advantageously of aluminum acetylacetonate, and of a solvent;
a2) adjustment of the pH to between 8 and 14, advantageously between 9 and 12, in particular to 10, for example using an aqueous solution of NaOH;
a3) stirring of the mixture, advantageously for a period of between 1 and 24 hours, in particular between 12 and 24 hours, more particularly at least 2 hours, even more particularly at least 12 hours, so as to obtain a gel;
a4) recovery of the solid phase of the gel obtained in step a3);
a5) drying of the solid phase of the gel obtained in step a4).

The solvent of step a1) may be a polar solvent such as water, alcohol (in particular ethanol or glycerol), propylene glycol, methyl-5-(di methylamino)-2-methyl-5-oxopentanoate (such as Rhodisolv® Polarclean sold by Solvay), propylene carbonate or mixtures thereof, advantageously water, alcohol (in particular ethanol or glycerol), or mixtures thereof, more particularly water, alcohol (in particular ethanol) or mixtures thereof. It may be a biobased and/or biodegradable solvent such as glycerol, propylene glycol, methyl-5-(dimethylamino)-2-methyl-5-oxopentanoate (such that Rhodisolv® Polarclean sold by Solvay), propylene carbonate or mixtures thereof, in particular glycerol, methyl-5-(di methylamino)-2-methyl-5-oxopentanoate (such as Rhodisolv® Polarclean sold by Solvay) or mixtures thereof. It may also be a mixture of alcohol and oil.

In the case where the active substance comprises an oil or is in liquid form, the solvent of step a1) may be absent.

On the other hand, in the case where the active substance is a solid, the solvent of step a1) must be present.

Step a3) can be carried out at a temperature of between ambient temperature and the boiling point of the solvent, advantageously at ambient temperature.

Step a4) can be carried out by any method well known to those skilled in the art, such as by filtration or centrifugation, in particular by centrifugation.

Step a5) may be carried out in an oven, for example at a temperature of 40° C., or by air-drying or by freeze-drying.

An intermediate step a4) bis may be added between steps a4) and a5), said intermediate step consisting of the washing of the solid phase of the gel obtained in step a4) with the solvent of step a1).

In one advantageous embodiment, when the compound comprises a microorganism and in particular when the microorganism is in vegetative form, the microorganism of step a1) is in the form of a preculture of said microorganism, advantageously having a microorganism content of between $10^3$ and $10^{19}$ CFU/ml, in particular between $10^6$ and $10^9$ CFU/ml, advantageously $10^8$ CFU/ml.

In this case, the process according to the invention may also comprise a prior step, before step a), of preparation of the microorganism preculture. This step can be carried out by methods well known to those skilled in the art. It comprises in particular the inoculation of the microorganism in a nutritive medium and incubation for a sufficient period to obtain the desired concentration of microorganism.

In another advantageous embodiment, the process according to the invention may also comprise a prior step, before step a), of preparation of the porous material saturated with the compound.

For the purposes of the present invention, the term "porous material saturated with the compound" is intended to mean any porous material according to the invention of which the content of the compound according to the invention is maximal.

This preparation step may be carried out by any method well known to those skilled in the art.

For example, in the case where the porous material is activated carbon, this step is carried out by bringing the activated carbon into contact, with stirring, with a solution containing the compound, advantageously an aqueous solution, in particular when the compound is tryptophan. The activated carbon saturated with the compound, advantageously saturated with tryptophan, is then recovered by simple filtration and drying.

The present invention also relates to a composite of porous material/compound/hybrid organic-inorganic material having a 2:1 lamellar structure of formula (I), obtainable by means of the process according to the present invention and in particular as described above.

Thus, the porous material, the compound and the hybrid material of formula (I) are as described above.

Advantageously, this composite is a composite of activated carbon/compound/hybrid organic-inorganic material having a 2:1 lamellar structure of formula (I) of talc type, more advantageously a composite of activated carbon/tryptophan/hybrid organic-inorganic material having a 2:1 lamellar structure of formula (I) of talc type.

The degree of incorporation of the compound within the composite is advantageously at least 70 mg of compound/g of composite, more advantageously at least 100 mg of compound/g of composite, even more advantageously at least 110 mg of compound/g of composite, in particular at least 115 mg of compound/g of composite.

The porous material/hybrid material of formula (I) weight ratio of the composite is advantageously at least 1/2, more advantageously at least 1/1, in particular at least 1.5/1.

The microorganism present in the composite may be revived by methods well known to those skilled in the art, such as for example by inoculation on solid nutritive medium (Petri dish) or in liquid nutritive medium (bioreactor).

The composite can be stored for between 0 and 12 months at a temperature of between 4° C. and ambient temperature.

When the compound is a microorganism or comprises a microorganism, the composite must be stored to a temperature of 4° C.

The present invention relates, furthermore, to a composition, in particular a phytopharmaceutical composition, advantageously intended for the fertilization, nutrition, growth stimulation and/or prophylaxis of plants and/or the improvement of the physical, chemical and/or biological properties of the soil or of the culture substrate of the plants, comprising the composite according to the invention.

This composition comprises any excipient suitable for administration to a plant or to the soil or culture substrate of plants, whether that be for example by application to the leaves, to the roots, in the open field or in soilless culture. It is in particular a phytopharmaceutically acceptable excipient.

For the purposes of the present invention, the term "phytopharmaceutically acceptable" is intended to mean acceptable for use on plants or the soil, that is to say which does not pollute the environment and which is non-toxic to human beings (users).

The composition may also comprise other active compounds which have a synergistic or complementary action on the plant or the soil or culture substrate of plants, such as for example nutrients advantageously chosen from the group constituted by nitrogen, phosphorous, potassium, calcium, magnesium, silicon, trace elements and mixtures thereof, organic raw materials and/or mineral raw materials, pesticides, fungicides, herbicides, nematicides, hormones, humic substances, algal extracts, amino acids, plant extracts, salicylic acid and salicylic acid precursors or analogs, nitric oxide and nitric oxide precursors or analogs, cyclic nucleotides and mixtures thereof.

This composition may therefore be in the form of a fertilizer or a biostimulant.

It may be in solid form, in particular in powder, granule or microgranule form, in liquid form or in gel form.

Thus, it may for example be in solid form of powder, granule or microgranule type in fertilizers or culture substrates for feeding or simulating plants for use in the open or for localized use.

It may also be in fertilizer or biostimulant liquid or gel form for use in application to the leaves or roots.

It may also be in the form of a water-soluble fertilizer for use in fertigation in the open field or in soilless culture.

It may moreover be in a solid or liquid amendment form for improving the physical, chemical or biological properties of the soil or of the culture substrate.

It may be a composition of the phytosanitary type or a composition of the biocontrol, PNPP (préparations naturelles peu préoccupantes—low risk natural products), SDN (stimulation des défenses naturelles—stimulation of natural defenses), SDP (stimulation des défenses des plantes—stimulation of plant defenses) type, in the case of the prophylaxis of plants.

The compositions according to the invention may therefore be used:
  by direct application on a soil, on the entire surface of the soil or, preferably, in a localized manner in the region of the roots of the plants to be treated; or
  by application at the level of the leaves and/or of the plants to be treated, by any suitable dispensing means, such as for example by spraying in the case of a liquid formulation.

These compositions may also be introduced into the water irrigation system and/or into fertilizer formulations.

In general, the amount of composition to be used depends on the nature of the plant to be treated, of the nature of the compound present in the composite and on the method of administration envisioned.

Those skilled in the art will be able to adjust the amounts to be used as a function of the method of application selected. In particular, relatively low amounts are used when the composition is applied in the region of the roots, whereas relatively larger amounts are used when the composition is applied on the entire surface of the soil.

These compositions may be used in a single application or else in sequential application.

In one particular embodiment, the composition according to the invention allows the controlled release of the compound in the soil. Indeed, the release kinetics depend on the hybrid material of formula (I) of the composite and on the ratio of porous material/hybrid material of formula (I) of the composite.

In addition, the composition according to the invention may comprise various composites according to the invention having different release kinetics in order to adjust and therefore control the release of the compound in the soil.

Finally, the present invention relates to the use of the composite according to the present invention or of the composition according to the present invention for the fertilization, nutrition, growth stimulation and/or prophylaxis of plants and/or the improvement of the physical, chemical and/or biological properties of the soil or of the culture substrate of plants, advantageously cultivated plants or plants of agronomic interest.

In particular, this use may be implemented by application to the leaves, the roots, in the open field or in soilless culture.

Indeed, the bacterium *Bacillus subtilis* makes it possible to stimulate the growth of plants and protects them against biotic stress (pathogens) and abiotic stress (lack of water). It makes it possible for water-insoluble phosphated forms of phosphorus to be dissolved in water.

The fungus *Piriformospora indica* improves the ability of plants to tolerate environmental stress, stimulates plant growth and promotes nutrient absorption.

Tryptophan is, for its part, a precursor for the production of auxin, a hormone which regulates root development in particular.

Essential oil, in particular of thyme, is a stimulator of natural defenses. *Spirulina* is producer of chemical compounds having a biological activity on plants.

Folic acid allows inhibition of the development of the primary roots and an increased development and also maturation of the secondary roots (horizontal elongation) by redistribution of auxin (growth hormone) in the primary roots.

The present invention will be understood more clearly on reading the description of the drawings and the following examples, which are given by way of nonlimiting indication.

FIG. 1 represents the amount of tryptophan released (%) in an aqueous medium as a function of time (in min) under the conditions of example 4 for various composites (C001, C003, C004, C005, C006) according to the invention and for activated carbon saturated in tryptophan (M25).

EXAMPLE 1: COMPOSITE OF ACTIVATED CARBON/TRYPTOPHAN/HYBRID MATERIAL OF FORMULA (I) OF TALC TYPE OBTAINED FROM AN 80 MOL % PHENYlTMS AND 20 MOL % TEOS ORGANOALKOXYSILANE MIXTURE (REFERRED TO AS CA/TRP/80PH-20TEOS)

1.A—Preparation of the Activated Carbon Saturated with Tryptophan (M25)

A carbon (denoted CA1) physically activated with steam (Bioconservacion, Spain) is milled. The particles having a size of less than 250 µm are used for the remainder of the treatments. 10 g of this carbon are brought into contact, with stirring, with one liter of an aqueous solution of tryptophan having a concentration equal to 10,000 mg·L$^{-1}$. After filtration using syringe filters with a porosity of 0.2 µm, the filtrate is assayed and the product is dried at 40° C. in an oven; the amount of tryptophan adsorbed is 309.3 mg·g$^{-1}$ of carbon, the amount of tryptophan in the carbon-based material is 236.2 mg·g$^{-1}$ of material (carbon+tryptophan). This compound is called CA1+TRP. The comparison between the X-ray diffractograms of the CA1 and CA1+TRP samples indicates that the tryptophan adsorption induces no structural modification of the activated carbon which contains quartz as impurity. Furthermore, the absence of diffraction peaks characteristic of tryptophan indicates that the latter is well adsorbed onto the activated carbon and does not crystallize at the surface.

1.B—Preparation of the CA/TRP/80pH-20TEOS Composite (C004)

2.16 g of magnesium nitrate hexahydrate (99%, Sigma Aldrich) are added to 20 mL of absolute ethanol (99.9%, Carlo Erba) and the mixture is kept stirring until complete dissolution. 200 mg of L-tryptophan (TRP) (>98%, Sigma Aldrich) are introduced with stirring, then 1 g of the CA1+TRP reference sample is introduced before the addition of a mixture consisting of 1.646 g of phenyltrimethoxysilane (98%, ABCR) and of 0.432 g of tetraethylsilane (98%, ABCR) (mixture by mass of 79.2% of PhenylTMS and 20.8% of TEOS which represents 80 mol % of PhenylTMS and 20 mol % of TEOS). The whole mixture is left to stir and then the pH of the solution is brought to a value of 10 by addition of 15 mL of an aqueous sodium hydroxide solution (>97%, Sigma Aldrich) having a concentration of 1M. After stirring for 24 h at ambient temperature, the solid is separated from the solution by centrifugation (speed of 10,000 rpm for 10 min). The solid is washed three times with ethanol, before being dried in an oven at 40° C. for 48 h. The compound (2.21 g) obtained is then ground in an agate mortar before being characterized. The X-ray diffractogram indicates that the structure of talc type of formula $Mg_3(RSi)_4O_8(OH)_2$ wherein R represents a mixture of phenyl group and of O-ethyl group is formed (presence of reflections characteristic of the lattice planes (001), (020,110), (130, 220) and (060)) and that it comprises the carbon-based compound (presence of reflections characteristic of carbon and of quartz) (degree of incorporation: 115.9 mg of tryptophan/g of composite).

EXAMPLE 2: COMPOSITE OF ACTIVATED CARBON/TRYPTOPHAN/HYBRID MATERIAL OF FORMULA (I) OF TALC TYPE OBTAINED FROM THE ORGANOALKOXYSILANE C16TMS (REFERRED TO AS CA/TRP/C$_{16}$TMS2.5 (C005))

1.13 g of magnesium nitrate hexahydrate (99%, Sigma Aldrich) are added to 20 mL of absolute ethanol (99.9%, Carlo Erba), and the mixture is kept stirring until complete dissolution. 200 mg of L-tryptophan (TRP) (>98%, Sigma Aldrich) are introduced with stirring, then 2.5 g of the CA1+TRP reference sample obtained according to example 1-A are introduced, before the addition of 2 g of hexadecyltrimethoxysilane (>85%, Sigma). The whole mixture is left to stir, and then the pH of the solution is brought to a value of 10 by addition of 15 mL of an aqueous sodium hydroxide solution (>97%, Sigma Aldrich) having a concentration of 1M. After stirring for 24 h at ambient temperature, the solid is separated from the solution by centrifugation (speed of 10,000 rpm for 10 min). The solid is washed three times with ethanol before being dried in an oven at 40° C. for 48 h. The compound obtained (4.11 g) is then ground in an agate mortar before being characterized.

The scanning electron microscopy image indicates that the CA1+TRP sample is totally encapsulated (degree of encapsulation: 119.7 mg of tryptophan/g of composite).

EXAMPLE 3: COMPOSITES CA/TRP/C$_{16}$TMS5, CA/TRP/C$_{16}$TMS1, CA/TRP/MTES AND CA/TRP/100% PHENYL

Using a process identical to that used to prepare the CA/TRP/C16TMS compound, other compounds according to the invention were prepared by replacing the hexadecyltrimethoxysilane as silicon source with methyltriethoxysilane (MTES) or phenyltrimethoxysilane (PhenylTMS) or by modifying the hexadecyltrimethoxysilane/CA1 (activated carbon) ratio. The compounds obtained were called, respectively, CA/TRP/MTES, CA/TRP/100% Phenyl, CA/TRP/C16TMS1 and CA/TRP/C16TMS5. The amount of compounds used and recovered and the degrees of encapsulation are collated in table 1 below.

TABLE 1

| Compound | Silicon source | Mass activated carbon (g) | Mass recovered (g) | Mass talc-type hybrid material (g) | Degree of encapsulation (mg TRP/g composite) |
|---|---|---|---|---|---|
| CA/TRP/MTES (C001) | MTES | 1 | 2.08 | 1.08 | 107.8 |
| CA/TRP/100% Phenyl (C003) | PhenylTMS | 1 | 2.04 | 1.04 | 125.1 |
| CA/TRP/C16TMS1 (C002) | $C_{16}$TMS | 1 | 2.66 | 1.66 | 76.7 |
| CA/TRP/C16TMS5 (C006) | $C_{16}$TMS | 5 | 6.52 | 1.52 | 148.6 |

It should be noted that, at equal carbon mass, the composite synthesized with PhenylTMS contains more tryptophan.
However, the encapsulation is better with the composite synthesized with $C_{16}$TMS. There is also a correlation between the mass of carbon integrated into the composite and the mass of talc-type hybrid material synthesized with $C_{16}$TMS.

EXAMPLE 4: DYNAMIC-MODE RELEASE KINETICS

The properties of tryptophan release from the composite according to the invention were studied according to the following protocol:

15 mg of the composite according to the invention were suspended in 50 ml of demineralized water, or 300 mg of the composite according to the invention were suspended in 1 L of demineralized water, so as to obtain a concentration of 300 mg/L.

Regular 5 ml specimens were taken and filtered immediately (cut-off threshold 0.2 μm).

UV-spectroscopy analyses were carried out on these specimens. A scan was thus performed in order to check that the UV signature is indeed that of tryptophan, then the tryptophan was quantified by analysis at 280 nm.

After analysis, the specimen is redissolved in the stock solution. When the tryptophan concentration stabilizes in the stock solution, the latter is filtered on a Büchner funnel and then the carbon-based material or the composite is again suspended in demineralized water. Thus, the protocol is repeated until there is no longer any tryptophan release. This mode is therefore referred to as dynamic mode.

The results are presented in FIG. 1.

It is noted (FIG. 1) that the release is very rapid for the activated carbon saturated with tryptophan (CA1+TRP (M25)) and for some composites (CA/TRP/MTES (C001) and CA/TRP/80Ph-20TEOS (C004)).

On the other hand, the release kinetics are slightly slower for the CA/TRP/100% Phenyl composite (C003) and even slower for the CA/TRP/$C_{16}$TMS2.5 (C005) and CA/TRP/$C_{16}$TMS5 (C006) composites. The release also varies as a function of the CA/talc-type hybrid material ratio as demonstrated in FIG. 1 for the CA/TRP/$C_{16}$TMS2.5 and CA/TRP/C16TMS5 composites: it increases if the ratio increases.

The invention claimed is:

1. A process for preparing a composite of porous material/compound/hybrid organic-inorganic material having a 2:1 lamellar structure, said hybrid material having the following general formula I:

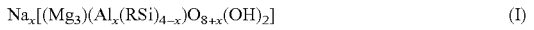

wherein
x is a number such that 0≤x<1.2 and
R represents a $C_1$-$C_{30}$ alkyl group, an aryl group, a ($C_1$-$C_{30}$ alkyl)aryl group or an O—($C_1$-$C_{30}$ alkyl) group, the alkyl group being optionally substituted with at least one substituent selected from phenyl, vinyl or mercaptopropyl,
and said compound being selected from the group consisting of at least one active substance and at least one microorganism and mixtures thereof,
the process comprising:
a) the step of sol-gel synthesis of the hybrid organic-inorganic material having a 2:1 lamellar structure in the presence of the compound and of the porous material saturated with the compound; and
b) the recovery of the composite,
wherein the silicon source required for the synthesis of the hybrid material of formula I of step a) is an organoalkoxysilane or a mixture of organoalkoxysilanes having the following general formula II: RSi(OR')$_3$ (II);
wherein R' is a methoxy or ethoxy group.

2. The process as claimed in claim 1, wherein step a) comprises the following steps:
a1) addition of a magnesium source, of the compound, of the porous material saturated with the compound, of the silicon source, in the case where x≠0, of the aluminum source, and of a solvent;
a2) adjustment of the pH to between 8 and 14;
a3) stirring of the mixture so as to obtain a gel;
a4) recovery of the solid phase of the gel obtained in step a3);
a5) drying of the solid phase of the gel obtained in step a4).

3. The process as claimed in claim 2, wherein the compound comprises a microorganism and the microorganism in step a1) is in the form of a preculture of said microorganism, and the process comprises a prior step, before step a), of preparation of the microorganism preculture.

4. The process as claimed in claim 1, wherein x=0.

5. The process as claimed in claim 1, wherein the compound is an amino acid active substance.

6. The process as claimed in claim 1, wherein the compound is a microorganism selected from the group consisting of a bacterium, a microalga, a fungus and mixtures thereof.

7. The process as claimed in claim 1, wherein the porous material is activated or non-activated carbon.

8. The process as claimed in claim 1, wherein the silicon source is selected from the group consisting of phenyltrimethoxysilane of the following formula (a): Phenyl-Si(OCH$_3$)$_3$ (a), tetraethyl orthosilicate of the following formula (b): Si(OC$_2$H$_5$)$_4$ (b), hexadecyltrimethoxysilane of the following formula (c): $CH_3(CH_2)_{14}CH_2$—$Si(OCH_3)_3$ (c), methyltriethoxysilane (MTES) of the following formula (d): $CH_3$—$Si(OCH_3)_3$ (d) and mixtures thereof.

9. The process as claimed in claim 1, which comprises a prior step, before step a), of preparation of the porous material saturated with the compound.

10. The process as claimed in claim 1, wherein the compound is tryptophan.

11. The process as claimed in claim 1, wherein the porous material is activated carbon.

12. The process as claimed in claim 1, wherein the silicon source is hexadecyltrimethoxysilane of the following formula (c): $CH_3(CH_2)_{14}CH_2$—$Si(OCH_3)_3$ (c).

13. The process as claimed in claim 1, wherein the source of silicon is selected from the group consisting of phenyltrimethoxysilane (a) and hexadecyltrimethoxysilane (c).

14. A composite of porous material/compound/hybrid organic-inorganic material having a 2:1 lamellar structure of formula (I), obtained by means of the process as claimed in claim 1.

15. A composition comprising the composite as claimed in claim 14 and an excipient.

16. The composition as claimed in claim 15, which is in solid form, in liquid form or in gel form.

17. The composition as claimed in claim 16, wherein the solid form is in powder, granule or microgranule form.

18. The composition as claimed in claim 15 which allows the controlled release of the compound in the soil.

19. The composition as claimed in claim 15, which also comprises nutrients, organic raw materials and/or mineral raw materials.

20. A method for the fertilization, nutrition, growth stimulation and/or prophylaxis of plants and/or the improvement of the physical, chemical and/or biological properties of the soil or of the culture substrate of plants comprising the administration of an effective amount of the composite as claimed in claim 14, or of a composition comprising the composite as claimed in claim 14 and an excipient, to a plant in need thereof or to the soil or culture substrate of a plant in need thereof.

21. The method as claimed in claim 20 application to the leaves, the roots, in an open field or in soilless culture of the plant in need thereof.

* * * * *